US005271787A

United States Patent [19]

Hoffmann et al.

[11] Patent Number: 5,271,787

[45] Date of Patent: Dec. 21, 1993

[54] METHOD OF MAKING AND USING A LABEL-EQUIPPED FORM

[75] Inventors: Donald J. Hoffmann, Elmhurst; Wayne E. Richter, Batavia, both of Ill.

[73] Assignee: Wallace Computer Services, Inc., Hillside, Ill.

[21] Appl. No.: 882,433

[22] Filed: May 13, 1992

Related U.S. Application Data

[63] Continuation-in-part of Ser. No. 705,313, May 24, 1991, and a continuation-in-part of Ser. No. 705,325, May 24, 1991.

[51] Int. Cl.[5] .............................................. B32B 31/00

[52] U.S. Cl. .................................... 156/268; 156/250; 156/252; 156/257; 156/289; 156/542; 156/538; 156/277; 40/628; 40/630; 283/51; 283/67; 283/109; 283/116; 283/901; 53/462

[58] Field of Search ............... 156/268, 250, 252, 278, 156/253, 257, 289, 270, 277, 542, 538; 283/67, 51, 109, 901, 116, 903; 53/462; 40/628, 630

[56] References Cited

U.S. PATENT DOCUMENTS

| | | | |
|---|---|---|---|
| 3,412,239 | 1/1969 | Smith . | |
| 3,914,483 | 10/1975 | Stipek, Jr. . | |
| 3,926113 | 12/1975 | Steidinger . | |
| 4,033,611 | 7/1977 | Johnsen | 283/6 |
| 4,188,252 | 2/1980 | Brown | 156/542 |
| 4,246,058 | 1/1981 | Lomeli et al. . | |
| 4,306,367 | 12/1981 | Otto | 40/2 |
| 4,345,393 | 8/1982 | Price et al. | 40/312 |
| 4,379,573 | 4/1983 | Lomeli et al. . | |
| 4,479,838 | 10/1984 | Dunsirn et al. . | |
| 4,525,229 | 6/1985 | Suzuki et al. | 156/229 |
| 4,526,405 | 7/1985 | Hattemer . | |
| 4,528,055 | 7/1985 | Hattemer | 156/247 |
| 4,605,458 | 8/1986 | Nakamura | 156/229 |
| 4,664,416 | 5/1987 | Steidinger . | |
| 4,749,432 | 6/1988 | Ando . | |
| 4,833,122 | 5/1989 | Doll et al. . | |
| 4,842,660 | 6/1989 | Voltmer et al. | 156/542 |
| 4,880,964 | 11/1989 | Donahue | 235/462 |
| 5,011,589 | 4/1991 | Felix | 156/257 |

FOREIGN PATENT DOCUMENTS

| | | |
|---|---|---|
| 121896 | 12/1990 | Japan . |

*Primary Examiner*—David A. Simmons
*Assistant Examiner*—Merrick Dixon
*Attorney, Agent, or Firm*—Tilton, Fallon, Lungmus & Chestnut

[57] ABSTRACT

A method of making a label-equipped sheet and product wherein the label is die-cut from base stock constituting the sheet and held in place by a pressure-sensitive adhesive-equipped release liner, the web patch constituting the release liner having a pattern of coatings thereon including a first pattern of release material so as to leave an uncoated perimeter and thereafter overcoated with pressure-sensitive adhesive.

4 Claims, 1 Drawing Sheet

METHOD OF MAKING AND USING A LABEL-EQUIPPED FORM

This application is a continuation-in-part of co-pending applications Ser. Nos. 705,313 and 705,325 both filed May 24, 1991.

BACKGROUND AND SUMMARY OF INVENTION

This invention relates to a method of making a label-equipped sheet and product and, more particularly, to a sheet or form wherein the label is die cut from base stock constituting the sheet and held in place by a pressure sensitive adhesive-equipped release liner until needed for use.

It has become increasingly desirable to provide sheets generally and business forms particularly of minimal thickness for ease in processing through computer printers, especially table top personal computers with associated printers. One approach to achieve this has been to die cut the form itself to provide a removable label. This art is well known for die cut labels generally in U.S. Pat. Nos. 3,914,483 and 4,246,058 and for business forms in U.S. Pat. No. 4,379,573.

However, with the processing of sheets such as business forms through printers and the subsequent converting of the connected forms into a roll or a zig-zag pack, it has become increasingly difficult to provide a label having sufficient "tack" while avoiding oozing of adhesive during processing of the form through the printer—particularly laser printers which generate substantial heat. Even where adhesive has been omitted—as by having the release liner overlap the adhesive (see U.S. Pat. No. 5,011,559), the seepage or oozing persists, particularly when significant amounts of strong adhesives like hot melts, are employed.

According to the invention, the foregoing problem is solved by providing a pattern of coatings on the web patch constituting the release liner. More particularly, a web ply is first coated with a pattern of release material such as a silicone in a pattern so as to leave an uncoated perimeter, i.e., a generally rectangular frame for a rectangular patch.

Thereafter, the entire ply is overcoated substantially over its already coated face with pressure sensitive adhesive—especially on most of the uncoated perimeter. When performed continuously, we omit the release coating from both longitudinal and transverse bands and thereafter coat with adhesive these areas as well as the previously release coated areas. When the patches are severed from a continuous ply and applied to a form or other label carrier constructed of label stock, the perimetric frame of the release liner patch adheres strongly to the form, effectively preventing oozing during laser printer printing. This strong adhesion effectively freezes the release liner patch in place on the form. This "frozen" area constitutes a dam effectively preventing the migration from the adhesive from the central part of the patch, i.e., the part equipped with the release liner. This "freezing" and damming stem from the fact that there is no release material in the perimetric frame area so that the two plies (patch and label stock) can bond together. This bonding serves as an effective barrier to seepage of adhesive.

In adding, in effect, adhesive to the border of the release liner ply patch we achieve, in addition to preventing oozing or creep of the adhesive, the significant advantage of securing the release liner ply to the form. Should an ordinary release liner ply, i.e., one without the adhesive border of our invention, become detached, the now-uncovered adhesive on the rear face of the label stock form could adhere the form unintentionally and most undesirably to an adjacent form.

The details of the inventive method and construction can be seen in the ensuing specification.

BRIEF DESCRIPTION OF DRAWING

The invention is described in conjunction with the accompanying drawing, in which.

DETAILED DESCRIPTION

Figure 1:
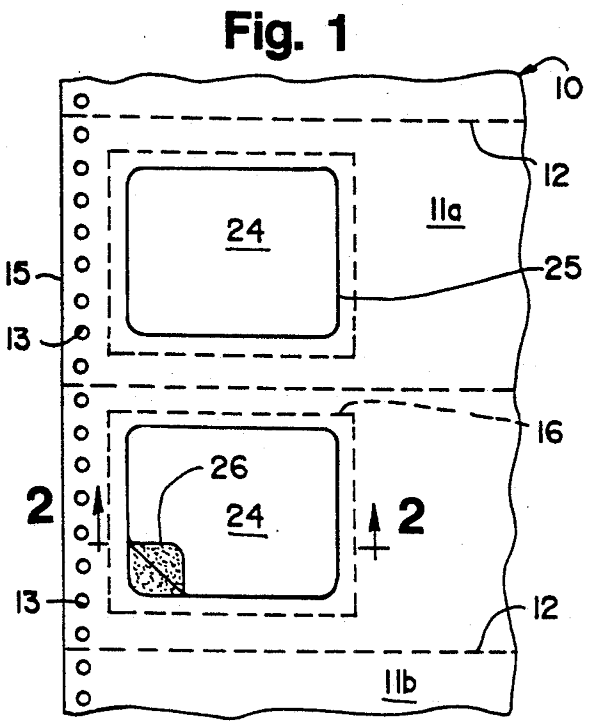
FIG. 1 is a fragmentary top plan view, partially in perspective of a continuous web such as business form string featuring the invention.
Figure 2:
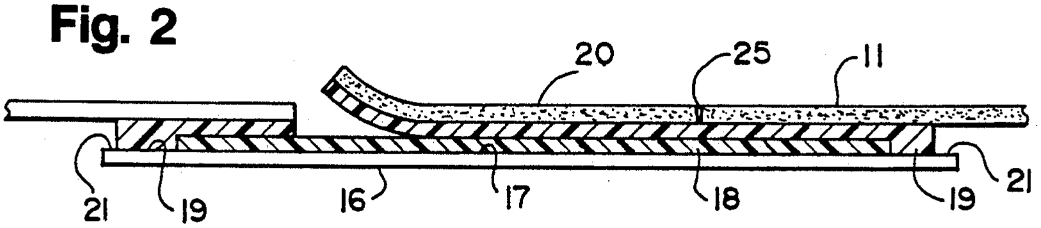
FIG. 2 is an enlarged sectional view such as would be seen along the sight line 2—2 applied to FIG. 1.

Referring to FIG. 1, the numeral 10 designates generally a string of interconnected business form lengths of the general type seen in co-owned U.S. Pat. No. 4,664,416. One form length is designated 11 with the adjacent preceding length being designated 11*a* and the following length 11*b*. As seen in FIG. 2, the form length is hatched to indicate paper but it will be appreciated that other label stock materials can be employed.

Usually, the form lengths are produced continuously and conveniently converted to rolls or zig-zag folded packs for shipment. Lines of transverse perforation 12 define the ends of each form length. The entire string is equipped with line holes 13 defining a control punch margin 14 along at least one longitudinally extending side 15.

Normally, however, line holes and therefore control punch margins, are provided along both longitudinal sides for better control of the web during both manufacture and subsequent processing through the computer printer—as seen in the '416 patent. However, for simplicity of presentation, the other control punch margin has been omitted from FIG. 1 and when the base stock web is just a sheet, both margins are usually omitted, as would be the case with snap-out forms.

The form length 11 is equipped with a novel patch 16 which combines the function of a release liner and an adhesive carrier. This can be appreciated from a consideration of FIG. 2. On one face 17 of the patch 16, we apply a pattern of silicone material 18. It will be noted that the release coating does not extend to the edges of the patch 16, the areas uncoated with release material being designated 19 (see also FIG. 4).

Overlying both the release coating 18 and the heretofore uncoated areas 19 is a layer or coating of pressure sensitive adhesive material 20. In particular, the coating 20 extends over at least a continuous substantial portion of the areas 19, i.e., a continuous perimeter. It is possible to leave a minor portion 21 of the area uncoated while still achieving the benefits of the invention.

Figure 5:
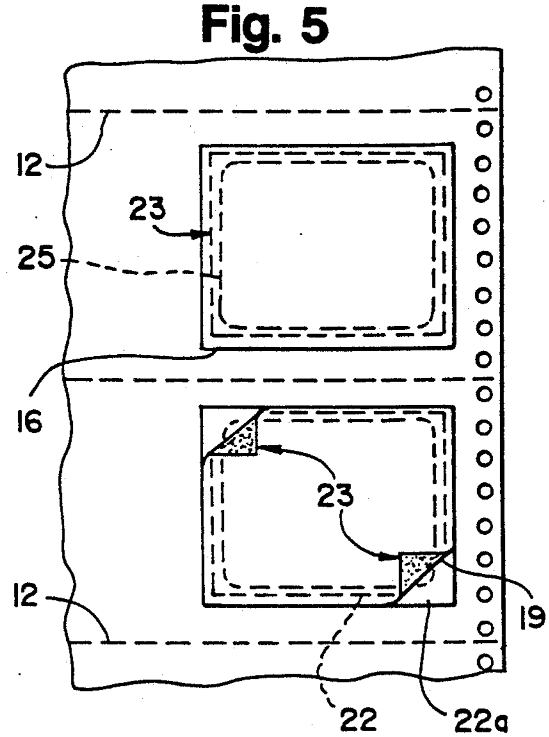
FIG. 5 is a fragmentary bottom plan view of the form seen in FIG. 1.
Figure 4:
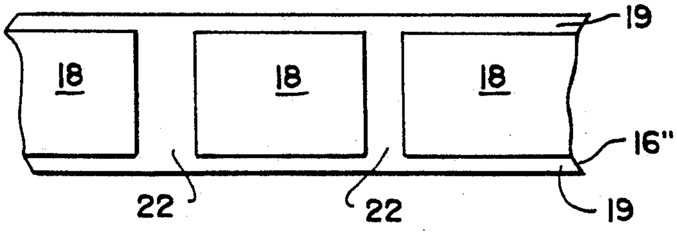
FIG. 4 is a fragmentary top plan view of the initially coated web such as would be seen along the sight line 4—4.

The same omission of release material occurs in transverse bands as can be appreciated from the showing at 22 in FIGS. 4 and 5. Thus, the invention provides a series of release liner patches applied to the form lengths 11, 11*a*, 11*b*, etc.

As mentioned previously, the invention contemplates omitting release material in perimetric frame area generally designated 23—see FIG. 5. This comprises the bands 19 and 22 (see FIG. 4). The patterned release material therefore provides longitudinally extending bands 19 and transversely extending band 22 on the liner patches 16 which also carry adhesive.

In FIG. 1, a plurality of labels each generally designated 24 is provided by a closed perimeter die cut 25 in each of the form sheets 11, 11*a*, 11*b*, etc. A corner or edge 26 thus can be readily lifted as illustrated in FIG. 1.

Figure 3:
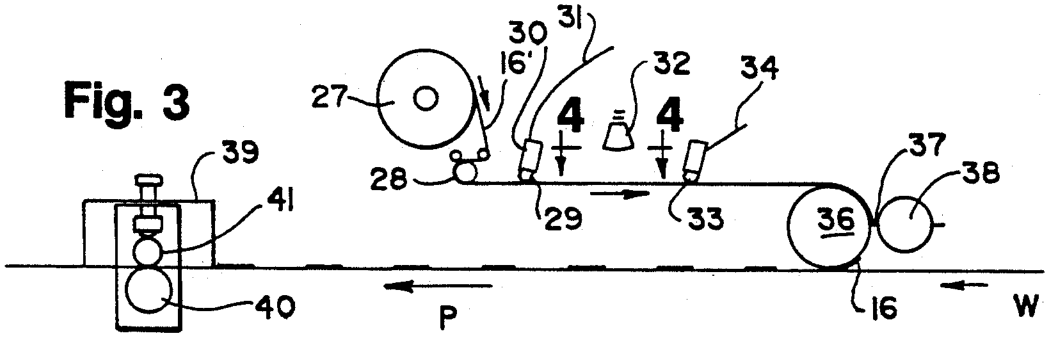
FIG. 3 is a side elevational view (essentially schematic) of apparatus employed in the practice of the inventive method.

It is believed that the invention can be further understood by describing the method of producing the label equipped form and this is set forth following in connection with FIG. 3.

The Inventive Method

Referring now to FIG. 3, the symbol W designates a web proceeding along a longitudinally extending path designated by an arrow P. The path normally is provided by side frames (not shown) and which carry the various processing rolls. Provided adjacent the path P is a roll 27 of web material suitable for silicone or other release liner application. This may be a bond paper and advantageously has a slightly higher moisture content than normal paper, viz., 5% as contrasted to the normally employed 2% for release liner patches. The continuous liner ply 16' is unwound from the roll 27 by means of an infeed 28 consisting of draw rolls and proceeds past a nozzle 29 for applying silicone release material to the face 17 thereof. The nozzle 29 is advantageously equipped with a solenoid controlled valve 30 to intermittently interrupt flow of material in supply line 31 to the nozzle 29 so as to develop the transverse areas 22 free of release material. The longitudinally extending silicone-free areas 19 can be achieved by employing a nozzle 29 having an orifice narrower than the width of the web 16'.

Thereafter the web 16'' (now coated with patterns of release material) can be subjected to drying as schematically indicated by the heat lamp 32 in FIG. 3. Next, the web 16'' advances past another nozzle 33 which applies pressure sensitive adhesive substantially across the entire width of the web 16''—omitting, for example, the minor edge portions 21, if desired. These may be of the order of 1/16''. The nozzle 34 is also equipped with a control valve 35 for cyclically interrupting the flow of adhesive in supply line 34 so as to develop any free portion as at 22*a* in FIG. 5 and which corresponds to the minor portion 21 of the longitudinal areas 19. This relieves the necessity of precise positioning of the pattern of adhesive on the release liner patch.

Advantageously, I can employ 8–10 lbs. per ream (500–22×26) of hot melt as compared with about 2 lbs. per ream of water based adhesive.

Thereafter, the liner ply 16'' passes around a vacuum roll 36 for engagement with a knife 37 of a cutoff roll 38. By rotating the vacuum cylinder 36 at a speed faster than the speed of the liner ply 16'', spaced apart patches 16 of liner material are applied to the web W being advanced along the longitudinal path P.

Downstream of the point at which the patches or plies of liner material 16 are applied to the web W, the web W is subjected to a die cutting operation as at 39. This is brought about by the operation of a knife roll 40 bearing against an anvil roll 41 so as to cut the closed perimeter 25 only in the web W and not in the liner patch 16. It will be appreciated that the closed perimeter die cut 25 is within the confines of the release liner 16—see FIG. 1. More particularly, the die cut 25 is within the adhesive covered frame 23 as can be seen from the upper form 11*a* showing in FIG. 5.

Although the invention is illustrated in conjunction with a rectangular patch employing a rectangular perimetric frame, it will be appreciated that other shapes may be used to advantage depending upon circumstances. In any event, the adhesive applied to the release coating should be dammed or circumscribed by a continuous band of adhesion between uncoated release liner and the label stock.

While in the foregoing specification, a detailed description of an embodiment of the invention has been set down for the purpose of illustration, many variations in the details hereingiven may be made by those skilled in the art without departing from the spirit and scope of the invention.

We claim:

1. A process for making and using a label-equipped form comprising the steps of advancing a web along a longitudinally extending path, applying a pattern of release material to one side of said web so as to define a perimeter free of release material, overcoating said web one side with pressure sensitive adhesive including substantially over said perimeter to provide a continuous band of adhesive in said perimeter, applying the twice-coated web to label stock, thereafter die cutting said label stock within the confines of said perimeter to provide a label peelably removable from said label stock and web, and peeling said label from said label stock while carrying with said label the adhesive within said die cut.

2. The process of claim 1 in which said steps include controlling the step of covercoating to leave uncoated with pressure sensitive adhesive a minor edge portion of said perimeter .

3. The process of claim 1 in which said steps include providing said label stock having a moisture content of the order of about 5%.

4. The process of claim 3 in which said steps include providing said pressure sensitive adhesive as a hot melt adhesive having about 8 to about 10 pounds per ream of said adhesive.

* * * * *